Nov. 19, 1935.   C. C. FARMER   2,021,769
TEST DEVICE
Filed Oct. 10, 1933
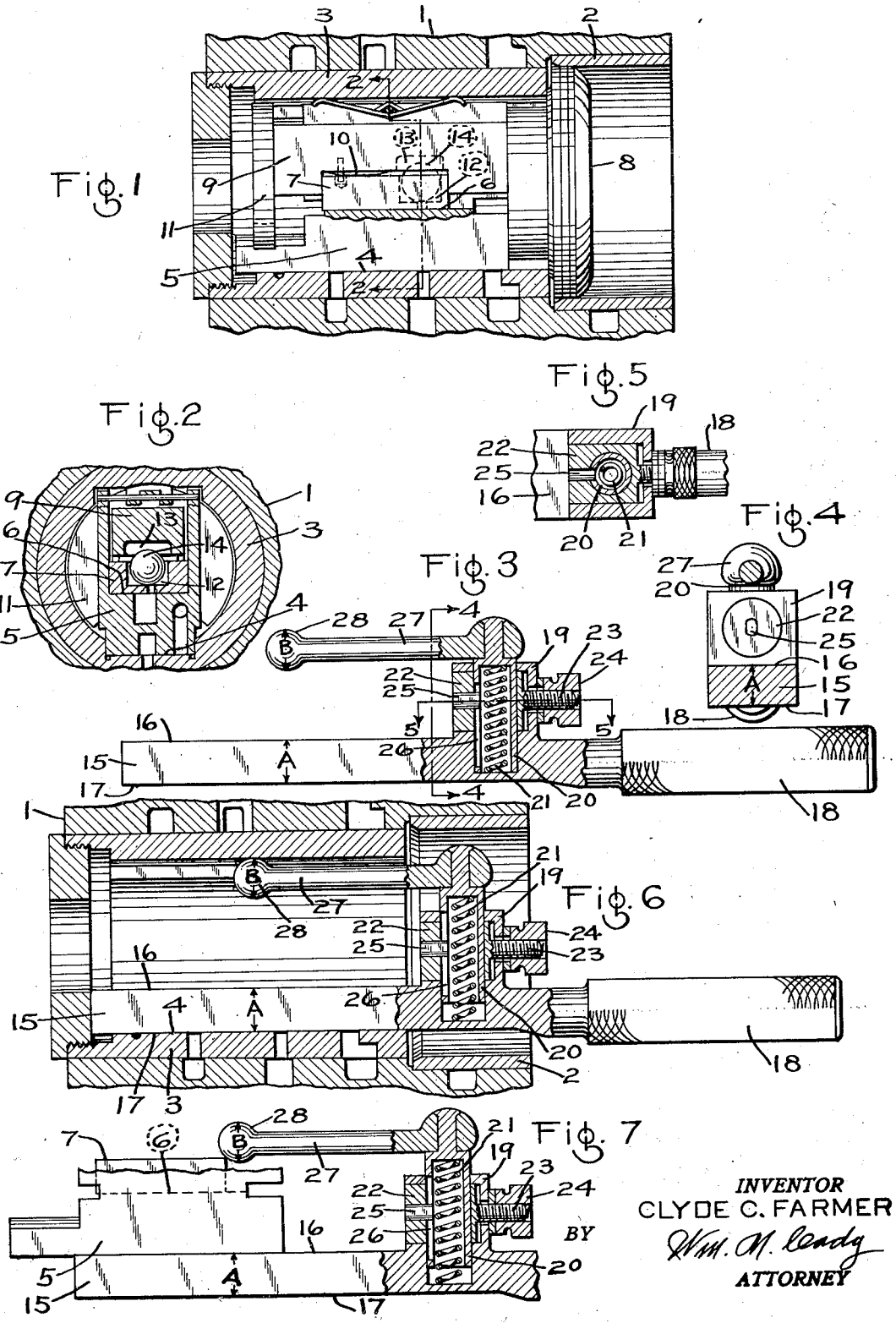
INVENTOR
CLYDE C. FARMER
BY *Wm. N. Cady*
ATTORNEY Patented Nov. 19, 1935

2,021,769

UNITED STATES PATENT OFFICE 2,021,769

TEST DEVICE

Clyde C. Farmer, Pittsburgh, Pa., assignor to The Westinghouse Air Brake Company, Wilmerding, Pa., a corporation of Pennsylvania Application October 10, 1933, Serial No. 693,001

3 Claims. (Cl. 33—174)

This invention relates to a test or gage device for checking wear on the movable parts of a fluid pressure operated valve device.

A valve device is disclosed in Patent No. 1,487,692 issued to T. H. Thomas on March 18, 1924, in which a valve chamber is charged with fluid under pressure by way of a communication established through a main slide valve and an auxiliary slide valve which is slidably carried by the main slide valve. This communication opens into a cylindrical cavity provided in the outer face of the auxiliary slide valve directly beneath the piston stem which is provided to move the slide valves. A ball is disposed in the cavity in the auxiliary slide valve and closely fits the cylindrical walls thereof, but yet has sufficient clearance to permit a restricted communication around the ball to the valve chamber. This ball is free to move into engagement with the piston stem, so that fluid pressure acting below the ball tends to react to hold the slide valve seated. Wear of the slide valve seats and the face of the slide valves engaging said seats tends to increase the distance which the ball may move out of the cavity in the auxiliary slide valve, but such wear must not become so great as to permit the greatest diameter of the ball to rise above the outer face of the auxiliary slide valve, since such would permit an increased flow of fluid under pressure past the ball and consequently reduce the pressure of fluid acting below the ball to hold the slide valves seated.

The principal object of my invention is to provide a gage device for determining whether or not the aggregate wear of the seats and seating faces of an assemblage of slide valves, such as above described, is such as to render them, as an assemblage, unfit for further use.

According to the above object, it will be noted that the gage device is provided to check the aggregate wear of an assemblage of slide valves and their seats, and not to check the wear of any one of the individual units of the assemblage, so that, by replacement of any one of the slide valves or the seats being gaged, the assemblage may be conditioned so as to be satisfactory for further use.

Other objects and advantages will be apparent from the following more detailed description of the invention.

In the accompanying drawing; Fig. 1 is a sectional view of a fluid pressure controlled valve device similar to that disclosed in the aforementioned patent; Fig. 2 is a sectional view taken on the line 2—2 of Fig. 1; Fig. 3 is a side elevation, partly in section, of my improved gage device; Fig. 4 is a sectional view taken on the line 4—4 of Fig. 3; Fig. 5 is a sectional view taken on the line 5—5 of Fig. 3; Fig. 6 is a sectional view similar to Fig. 1 but with the movable parts of the fluid pressure controlled valve device removed and my improved gage device applied thereto; and Fig. 7 is an elevational view of the slide valves shown in Fig. 1, but with my improved gage device applied thereto.

As shown in the drawing, the fluid pressure operated valve device comprises a casing 1 having axial bores of different diameters, one of said bores being lined with a piston bushing 2, while the other of said bores is lined with a valve bushing 3. The valve bushing 3 is provided interiorly on one side with a flat valve seat 4. A main slide valve 5 is provided with one face slidably engaging the valve seat 4, while the opposite face forms a seat 6 which is slidably engaged by an auxiliary slide valve 7. For moving the slide valves 5 and 7 on their respective seats, a piston 8 is slidably mounted in the bushing 2 and is adapted to engage the right hand end of the main slide valve 5 for moving said slide valve toward the left hand. Said piston is provided with a stem 9 having a slot 10 in which the auxiliary slide valve 7 is operatively disposed, and a guide member 11 is provided on the outer end of said stem and is adapted to engage the left hand end of the main slide valve 5 for moving same toward the right hand.

A cylindrical cavity 12 is provided in the outer face of the auxiliary slide valve 7 beneath the piston stem 9, and an axial cylindrical cavity 13 is provided in the adjacent face of said stem. A ball 14 is mounted in the cavity 12 with a certain definite clearance and is permitted to move into cavity 13, but such movement is limited by engagement with stem 9 so that with the slide valves 5 and 7 in good condition, the greatest diameter of said ball will be held within the cavity 12.

Wear of the slide valves 5 and 7 and their respective seats will increase the distance between the adjacent faces of the auxiliary slide valve 7 and piston stem 9 and consequently will permit the ball 14 to move out of the cavity 12 a greater distance than before such wear occurred, and if the wear becomes sufficient to permit the greatest diameter of the ball to rise above the outer face of the auxiliary slide valve 7, the area of the opening between the ball 14 and the cylindrical wall of cavity 12 will become greater than that desired and may cause the device to fail.

According to my invention, I provide a gage device, particularly adapted to be used after a valve device of the above character has been subject to wear, for determining whether the aggregate wear of the slide valves and their seats has become sufficient to prevent the device from functioning as intended.

The gage device comprises a base 15 having oppositely disposed flat and parallel faces 16 and 17. The thickness of the base 15, or the dimension A, is predetermined, for reasons which will hereinafter be described, and the width and length of the base or of the faces 16 and 17 is substantially the same as the width and length of the main slide valve 5, so that said base will slide into the valve bushing 3 in substantially full engagement with the valve seat 4. Projecting from one end of the gage base 15 is a handle 18 for carrying the gage.

A raised portion or boss 19 projects from the face 16 at one end of the gage base 15, and is provided with a bore at right angles to the face 16. A sleeve 20 is slidably mounted in the bore in the boss 19, said sleeve having an axial bore open at one end to the bore in boss 19. A spring 21 contained in the bore in said sleeve acts against the bottom wall of said bore and that in the boss 19 for urging the sleeve 20 outwardly of the boss 19.

The boss 19 is provided with another and larger bore at right angles to the bore in which the sleeve 20 is mounted, said larger bore extending only part way through the boss 19. A clamping member 22 is slidably mounted in this larger bore and is provided with a through bore through which the sleeve 20 is adapted to freely move. A pin 23 projects from one end of the clamping member 22 through an aperture in the boss 19, which aperture opens into one end of the bore containing said member. The pin 23 is screw-threaded and carried by said pin, exteriorly of the boss 19, is a lock nut 24. A pin 25, carried in the other end of the clamping member 22, projects into a slot 26, provided longitudinally through the wall of sleeve 20, to prevent said sleeve from turning relatively to the boss 19.

An arm 27 is secured to the outer end of the sleeve 20 directly over the center of the base 15, said arm being provided on the outer end with a spherical or ball-like enlargement 28, the dimension B of which is fixed as in the case of the dimension A on the base 15.

To use the gage device, the piston 8 and slide valves 5 and 7 are removed from their respective bushings 2 and 3, and the piston 8 is then removed from said slide valves.

By means of the handle 18, the gage device is then inserted into the bushing 3 with the face 17 of the base 15 in substantially full engagement with the main slide valve seat 4, as shown in Fig. 6 of the drawing, said full engagement of face 17 with valve seat 4 positioning the gage device for gaging operation. The lock nut 24 is then released on the pin 23 which frees the sleeve 20 within the bore through the locking member 22, whereupon, spring 21 acts to move the sleeve 20 outwardly of the boss 19. The sleeve 20 thus moves outwardly until the ball-like end 28 of the arm 27 engages the bushing 3 after which the nut 24 is screwed onto the pin 23, thereby pulling the locking member 22 against the sleeve 20 and locking the sleeve and thereby the ball-like end 28 of the arm 27 in the adjusted position. The gage device is then removed from the bushing 3.

After adjusting the gage device and then removing it from the bushing 3, as just described, the main slide valve 5, with the auxiliary slide valve 7 mounted thereon, is mounted on the face 16 of the base 15 as shown in Fig. 7. On account of the full bearing of the seating face of slide valve 5 on face 16 of the gage base 15, the slide valves are properly positioned to be gaged. The main slide valve 5 is then moved along the face 16 in a direction toward the handle 18, and if the auxiliary slide valve passes beneath the ball-like end 28 of the arm 27, it indicates that the aggregate wear of the slide valves 5 and 7 and their seats is such that in the operation of the fluid pressure controlled valve device the ball 14 will be permitted to rise out of the cavity 12 in the auxiliary slide valve 7 a greater distance than is permissible for satisfactory operation. If, however, as the slide valve 5 is moved along the face 16 towards the handle 18, the auxiliary slide valve 7 is engaged by the ball-like end 28 of the arm 27 so as to stop further movement of said slide valve with the main slide valve 5, it indicates that the condition of the particular combination of slide valves and valve seats is satisfactory for further use.

In the gage, the sum of the dimensions A and B is equal to the perpendicular distance between the top of the auxiliary slide valve 7 and the bushing 3 plus a predetermined calculated dimension representing the maximum wear of the slide valves and their seats which it is possible to permit without causing the valve device to fail to operate as intended.

If the slide valves 5 and 7 and bushing 3 are in new condition and the gage is applied thereto in the manner hereinbefore described, it will be evident that the auxiliary slide valve 7 will fail to pass under the ball-like end 28 of arm 27 by an amount equal to the calculated permissible wear. If, however, the wear of the main slide valve seat 4, as measured by the gaging operation illustrated in Fig. 6, plus the combined wear of the seating face of the main slide valve 5 and the seating face and seat of the auxiliary slide valve 7, is equal to or exceeds the calculated permissible wear above described, then in the gaging operation illustrated in Fig. 7, the auxiliary slide valve 7 will pass beneath the ball-like end 28 of the arm 27 and thereby condemn the particular combination of slide valves and bushing for further use. This gage does not condemn either of the slide valves or the bushing 3 as individual units of the combination, but merely the combination, so that it is possible, by providing a different main slide valve or auxiliary slide valve, or bushing in the combination, to provide a combination which the gage device will not condemn and which therefore will be satisfactory for use in service.

It will be noted that on account of the large area of engagement between surfaces 16 and 17 of the base member and valve 5 and seat 4, respectively, during use of the gage, the gage is automatically positioned with respect to the elements being gaged so as to enable easy and rapid use of the gage with a minimum of inaccuracy.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A gage device for indicating the aggregate wear of the seats and seating faces of a pile of slide valves adapted to be mounted one on top of the other in a bore in the body of a fluid pressure controlled valve device, said body having a valve seat open to said bore for engagement by one of the outer slide valves of said pile, said gage device comprising a base member having parallel faces of substantially the same area as said valve seat, one of said faces being adapted to engage said valve seat and the other of said faces being adapted to carry said pile of slide valves, an arm carried by said base member and movable relatively thereto in a direction at right angles to said faces, gage means carried by said arm adapted to engage the body within said bore, resilient means for automatically moving said arm and thereby said gage means into engagement with said body, and locking means for holding said arm and gage means in the condition in which said gage means engages said body within said bore, the distance between said other face of said base member and the adjacent portion of said gage means forming a gage for checking the aggregate thickness of said pile of slide valves, as a unit.

2. A gage device for use in connection with a fluid pressure controlled valve device of the type comprising a body having a bore, a slide valve seat formed in said body and open to said bore, a main slide valve having one side adapted to engage with said seat and having on the opposite side a slide valve seat, and an auxiliary slide valve adapted to engage the seat on said main slide valve, said gage device comprising a base member having one face adapted to substantially fully engage the slide valve seat in said body and an opposite and parallel face adapted to slidably support said slide valves, mounted one on the other in a position to be gaged, an arm carried by said base member and movable relatively thereto in a direction at right angles to said faces, a ball-like enlargement on one end of said arm disposed centrally over the longitudinal axis of said base member and movable away from said base member into engagement with said bore, the distance between the face of said base member carrying said slide valves and the adjacent area of said ball-like enlargement forming a gage for indicating the aggregate thickness of both of said slide valves as said slide valves are moved upon the face of said base member.

3. A gage device comprising a base member having opposite and parallel gaging surfaces of large area for holding said gage in a gaging position and for supporting elements in a position to be gaged, a substantially L-shaped arm carried by said base member and movable relatively thereto in a direction at right angles to one of said parallel gaging surfaces, and a gaging element carried by said arm and having two gaging points spaced different distances from the gaging surfaces of said base member and cooperative with the gaging surfaces of said base member for effecting measurements.

CLYDE C. FARMER.